United States Patent [19]

Buljan et al.

[11] Patent Number: 4,708,037

[45] Date of Patent: Nov. 24, 1987

[54] COATED CEMENTED CARBIDE TOOL FOR STEEL ROUGHING APPLICATIONS AND METHODS FOR MACHINING

[75] Inventors: Sergei-Tomislav V. Buljan, Acton; Helmut Lingertat, Dorchester; J. Gary Baldoni, II, Walpole; Vinod K. Sarin, Lexington, all of Mass.

[73] Assignee: GTE Laboratories Incorporated, Waltham, Conn.

[21] Appl. No.: 943,987

[22] Filed: Dec. 19, 1986

Related U.S. Application Data

[62] Division of Ser. No. 799,088, Nov. 18, 1985.

[51] Int. Cl.$^4$ .................... B23B 1/00; B23B 27/14; B22F 5/00; C22C 29/00
[52] U.S. Cl. ..................... 82/1 C; 407/119; 428/457; 428/698; 428/699
[58] Field of Search .......... 82/1 C; 407/119; 428/328, 698, 699, 457

[56] References Cited

U.S. PATENT DOCUMENTS

| | | | |
|---|---|---|---|
| Re. 31,526 | 2/1984 | Smith et al. | 75/235 |
| 3,525,610 | 8/1970 | Meadows | 75/204 |
| 3,737,289 | 6/1973 | Rudy | 29/182.7 |
| 3,752,655 | 8/1973 | Ramqvist | 29/182.5 |
| 3,779,746 | 12/1973 | Rudy | 75/176 |
| 3,955,038 | 5/1976 | Lindstrom et al. | 428/457 |
| 4,018,631 | 4/1977 | Hale | 148/315 |
| 4,035,541 | 7/1977 | Smith et al. | 428/217 |
| 4,097,275 | 6/1978 | Horvath | 75/203 |
| 4,101,703 | 3/1978 | Schintlmeister | 428/216 |
| 4,150,984 | 4/1979 | Tanaka et al. | 75/238 |
| 4,268,582 | 5/1981 | Hale et al. | 428/446 |
| 4,269,899 | 5/1981 | Fuyama et al. | 428/457 |
| 4,282,289 | 8/1981 | Kullander et al. | 428/457 |
| 4,320,156 | 3/1982 | Oakes et al. | 427/213 |
| 4,323,325 | 4/1982 | Samantha et al. | 82/1 C |
| 4,352,308 | 10/1982 | Samantha et al. | 82/1 C |
| 4,357,382 | 11/1982 | Lambert et al. | 428/212 |
| 4,497,228 | 2/1985 | Sarin et al. | 82/1 C |

FOREIGN PATENT DOCUMENTS 1291388  10/1972  United Kingdom .

OTHER PUBLICATIONS

V. K. Sarin and S. T. Buljan, "Microstructure Performance Relationships of Cemented Carbide Cutting Tools", pp. 327-337, Proc. International Powder Met. Conf., Bombay, India, 1983, published by Oxford IDH Publishing Co., New Delhi, India, 1985.

J. Gary Baldoni, "State of the Art of Coated Carbides", The Carbide and Tool Journal, pp. 26-29, Nov.-Dec. 1980.

*Primary Examiner*—M. Jordan
*Assistant Examiner*—Jerry Kearns
*Attorney, Agent, or Firm*—Ivan L. Ericson

[57] ABSTRACT

A steel roughing grade coated cemented carbide cutting tool comprises WC grains equal to or less than 70 w/o of the tool substrate, from about 5 to about 10 w/o of a cobalt bonding phase and the remainder being metal carbide grains selected from the group TiC, TaC, NbC, HfC and combinations thereof. The average WC grain size is from about 0.9 to about 1.3 microns and less than 10% of the WC grains have a size less than 0.5 microns. The coated cemented carbide tool is coated with an adherent refractory coating layer. The coated cemented carbide cutting tool can be used to machine steel at rough and heavy rough cutting conditions.

2 Claims, No Drawings 4,708,037

COATED CEMENTED CARBIDE TOOL FOR STEEL ROUGHING APPLICATIONS AND METHODS FOR MACHINING

This is a divisional of co-pending application Ser. No. 799,088 filed on Nov. 8, 1985.

FIELD OF THE INVENTION

This invention relates to a cemented carbide tool. More particularly, this invention relates to coated cemented carbide cutting tools for steel roughing applications and machining methods utilizing coated cemented carbide cutting tools.

BACKGROUND OF THE INVENTION

The wear of cutting tools in a machining operation is a complex, dynamic process in which a number of operative mechanical and chemical factors contribute to degradation of the cutting edge. In steel roughing operations, in addition to gradual erosion of the tool edge (wear) an important consideration, due to severe loading conditions, is tool deformation and impact resistance.

The wear resistance of the tool is often increased by application of hard carbide, carbonitride or nitride coatings of metals such as titanium or oxides of aluminum. The wear resistance of coated tools is controlled by the properties of the substrate and coating. The impact resistance, as well as deformation resistance, of the tool stems from the bulk properties of the coated tool substrate. Substrate deformation may result in a complete or partial decohesion of the coating or its cracking and chipping, accelerating wear and leading to the destruction of the tool.

Prior art cites examples of attempts to improve tool impact resistance through the development of complex layered substrates having an outside layer of high deformability and an inside essentially less deformable core. The deformable surficial layer serves as a cushion which dissipates impact energy and renders a tool more impact resistant.

The prior art also suggested that impact resistance of cemented carbide tools containing excess carbon with a dense surficial layer essentially void of free carbon may be improved by application of multilayered coatings and through special diffusion treatment (U.S. Pat. No. 4,150,195).

OBJECT OF THE INVENTION

Accordingly, it is an object of the present invention to provide a new and improved coated cemented carbide cutting tool having improved wear and impact resistance.

SUMMARY OF THE INVENTION

In accordance with the present invention, a new and improved coated cemented carbide cutting tool comprises a densified body having tungsten carbide grains, metal carbide grains selected from the group consisting of TiC, TaC, NbC, HfC, and combinations thereof, a bonding phase consisting essentially of cobalt and an adherent refractory coating layer. The tungsten carbide grains are equal to or greater than 70 weight percent of the densified body. The cobalt is from about 5 to about 10 weight percent of the densified body and the metal carbide grains comprise the remainder. The tungsten carbide grains have an average grain size from about 0.9 to about 1.3 microns and less than 10 percent of the tungsten carbide grains have a size less than 0.5 microns.

In accordance with another aspect of the present invention, a new and improved method of machining steel utilizing the new and improved coated cemented carbide cutting tool as previously described comprises the following steps:

A steel work piece on a lathe is turned at an effective speed of up to about 275 surface feet per minute for rough cutting and up to about 130 surface feet per minute for heavy rough cutting. The new and improved coated cemented carbide cutting tool is moved across the surface of said steel work piece at a feed rate from about 0.01 to about 0.04 inches per revolution for rough cutting and from about 0.050 to about 0.080 inches per inches per revolution for heavy rough cutting. The steel workpiece is cut with the new and improved coated cemented carbide cutting tool to effect a depth of cut of about 0.125 to about 0.500 inches for rough cutting and about 0.150 to about 0.500 inches for heavy rough cutting.

DETAILED DESCRIPTION OF THE INVENTION

The new and improved coated cemented carbide cutting tool of this invention is characterized by a tailored microstructure containing a balanced amount of fine and coarser tungsten carbide grains to obtain an optimum combination of impact resistance and wear resistance. The impact resistance and wear resistance of the new and improved coated cemented carbide cutting tool was measured by machining tests illustrated in Tables I and III. The specific cutting tools used in the machining test listed in Table I were cemented carbide cutting tools CVD coated with titanium carbide. The substrate composition can be equal to or greater than 70 weight percent tungsten carbide grains, from about 5 to about 10 weight percent cobalt and the remainder comprising metal carbide grains selected from the group consisting of TiC, TaC, NbC, HfC, and combinations thereof. The specific substrate compositions of the tools listed in Table I were: 6 w/o TaNbC, 3 w/o TiC, 6 w/o Co, and the remainder WC. The tungsten carbide grain size distribution of the substrates used for the cutting tools #1, 2 and 3 are shown in Table II listed as 100% A, 50% A+50% B and 100% B respectively. As can be seen in Table I the cutting tool #2 has a superior wear resistance compared to tool #1 and a superior impact resistance, average number of impacts to failure, compared to tool #3.

The grain size distribution and corresponding average grain size of the substrates, densified bodies, listed in Table II where measured by a quantitative metallurgical analysis technique whereby photomicrographs of cross sections of the densified bodies were analyzed by tracing the periphery of all the tungsten carbide grains shown in the photomicrograph and the grains traced were grouped by size and the data converted by computer to volume percent of grains at equivalent diameters utilizing the relationship that area fraction equals linear fraction equals volume fraction.

Another machining test illustrated in Table III was made using TiC/TiN coated cemented carbide cutting tools. The TiC was an intermediate layer and the TiN was the outer layer. Tool #6 was a commercial cemented carbide tool designated as C5 which was coated with the TiC/TiN coating at the same time as tools #4 and #5. Tool #4 was a TiC/TiN coated cemented carbide tool which had a substrate tungsten carbide grain size distribution as listed in Table II as 100% A and tool #5 was a TiC/TiN coated cemented carbide tool which had a substrate tungsten carbide grain size distribution as listed in Table II as 50% A+50% B. As illustrated by the results in Table III both tool #4 and #5 are superior to tool #6 which has a very poor impact resistance. Tool #5 has the superior wear resistance but tool #4 has the superior impact resistance. As these tests illustrate one can tailor the microstructure of the cutting tool to obtain the desired characteristics and to balance these characteristics to obtain the best tool for a given job.

An example of a process to achieve the desired mechanical properties for roughing grade tools through microstructural manipulation follows:

The starting materials are:
1. Tungsten carbide coarse powder A (FSSS of 13.5 microns) and medium size powder B (FSSS of 3.8 microns);
2. a mixture of 50 w/o tungsten carbide, 50 w/o titanium carbide;
3. a mixture of 60 w/o tantalum carbide, 40 w/o niobium carbide; and
4. cobalt metal powder.

The batching Formulation is a 6 w/o Co; 6 w/o TaNbC (60/40); 3 w/o TiC added as WC/TiC solid solution; 85 w/o WC.

TABLE I

Machining Tests of TiC Coated Cemented Carbide Cutting Tool

| Tool Sample No. Substrate min/in. | Interrupted Cut of Steel Workpiece Average Number of Impacts to Failure | Continuous Cut of Steel Workpiece Wear Resistance $(dV_B/dt)^{-1}\, 10^3$ |
| --- | --- | --- |
| (1) 100% A (Coarse) | 1394 | 0.47 |
| (2) 50% A + 50% B | 580 | 1.25 |
| (3) 100% B (Medium) | 42 | 1.52 |

Coating: TiC CVD coated
Substrate: 6 w/o TaNbC, 3 w/o TiC, 6 w/o Co, Balance WC

TABLE II

WC GRAIN SIZE DISTRIBUTION IN THE WC-6% Co-Cub. CARBIDE SUBSTRATES WITH "A" & "B" BLENDS OF WC POWDERS

| Grain Size ($\mu$m) | VOL % OF WC GRAIN MAXIMUM DIAMETER | | | | | | | | | | | Average WC Grain Size, D |
| --- | --- | --- | --- | --- | --- | --- | --- | --- | --- | --- | --- | --- |
| | 0.5 | 1.0 | 1.5 | 2.0 | 2.5 | 3.0 | 3.5 | 4.0 | 4.5 | 5.0 | 5.5 | |
| Blend 100% A | 0.04 | 6.1 | 11.6 | 15.8 | 22.1 | 12.8 | 15.9 | 7.2 | 5.3 | 3.2 | 0 | 1.60 |
| 75% A + 25% B | 0.06 | 7.0 | 11.6 | 13.8 | 18.8 | 16.6 | 13.8 | 6.1 | 10.1 | 2.0 | 0 | 1.57 |
| 50% A + 50% B | 0.4 | 14.6 | 13.2 | 15.2 | 16.7 | 10.1 | 8.7 | 10.8 | 6.1 | 4.4 | 0 | 1.28 |
| 25% A + 75% B | 2.0 | 38.5 | 24.0 | 14.5 | 13.7 | 4.5 | 2.5 | 0 | 0 | 0 | 0 | 0.91 |
| 100% B | 0.8 | 45.4 | 23.5 | 16.8 | 10.9 | 1.1 | 1.5 | 0 | 0 | 0 | 0 | 0.97 |

*Photos - 7000X

TABLE III

Machining Tests of TiC/TiN Coated Cemented Carbide Cutting Tools

| Tool Sample No. Substrate min/in. | Interrupted Cut of Steel Workpiece Impacts to Failure Range | Continuous Cut of Steel Workpiece Wear Resistance $(dV_B/dt)^{-1}\, 10^3$ |
| --- | --- | --- |
| (4) 100% A (Coarse) | 2,820 to 6,425 | 1.1 |
| (5) 50% A + 50% B (Medium) | 764 to 3,053 | 1.6 |
| (6) C5 | 100, 100 | 1.4 |

Coating: CVD TiC (intermediate)/TiN(outer) coating
Substrate: 8 w/o TiC, 11.5 w/o TaC, 8.5 w/o Co, balance WC
WC, approximately 0.125 w/o Carbon, and approximately 2 w/o paraffin as a binder.

A 200 g batch comprises a blend of: 12 g cobalt metal powder; 12 g TaNbC powder (60/40); 12 g WTiC powder; 82 g coarse WC powder, 82 g medium WC powder, 0.25 g carbon and 4 g of paraffin.

Processing

A 500 cc capacity attritor mill is charged with 200 g batch of powder, 0.250 g of carbon, 4 g of paraffin, 150 cc of heptane and 2000 g of ⅛" cemented carbide milling media and milled for 2½ hours. After milling, the powder is separated from the milling media by washing it with additional heptane. The excess heptane is slowly evaporated. The dry grannules are then sieved in two steps through 40 and 80 mesh screens and pressed at 10 tons/in² into compacts measuring 0.630×0.630"×0.260".

Sintering

The pressed compacts are dewaxed in a hydrogen furnace at 500° C. for 2 hours. The final sintering is carried out in a vacuum furnace at 100 microns of Hg. for 1 hr. at 1475° C. then cooled to room temperature.

The preferred microstructure was obtained by blending 50 w/o coarse sized WC powder with 50 w/o medium sized WC powder with 6 w/o Co, 6 w/o TaNbC 60/40, and 3 w/o TiC. See Table II for the grain size distribution of the densified bodies made from coarse sized WC powder, medium sized WC powder and mixtures of the two. The materials used in development of this roughing grade were supplied by the Chemical & Metallurgical Division of GTE Products Corporation Towanda, PA and by STARCK of W. Germany. The microstructure and the properties of the cemented carbide are very much dependent on the quality of the starting materials as well as on the composition, milling and sintering temperature schedule.

Table IV shows analysis of materials used in the roughing grade tool development.

TABLE IV

| | Analysis of Raw Materials | | | | |
|---|---|---|---|---|---|
| | Total Carbon % | Free Carbon % | Theoretical Carbon % | % O$_2$ | FSSS |
| Cobalt powder | — | — | — | .82 | 1.5 |
| WC (A) powder | 6.10–6.20 | .08 | 6.13 | .04 | 13.5 |
| WC (B) powder | 6.10–6.20 | .08 | 6.13 | .05 | 3.8 |
| WC/TiC 50/50 powder | 12.75 | .31 | 13.08 | .20 | 2.3 |
| TaNbC 60/40 powder | 8.31 | .50 | 8.09 | .21 | 2.2 |
| Carbon black | (high purity) | | | | |

The formulation with the desired microstructure could be made with or without carbon porosity. Taking into account the carbon balance of the starting powders and the processing described in part one, additions in excess of 0.04 w/o of carbon result in carbon porosity. Additions of 0.125 w/o and 0.250 w/o of carbon result in ASTM C2 and C5 carbon porosities respectively. Higher carbon content is desirable to prevent a brittle Eta phase formation at the substrate coating interface which is caused by the depletion of carbon from the substrate during CVD coating. In all cases where the microstructure for roughing grade and carbon porosity coexisted both systems complimented each other in terms of mechanical properties and tool performance.

Another formulation with the desired microstructure but with additional carbon added can be fabricated into cutting tools with cobalt enriched gamma-free (cubic carbide) layer up to 30 microns thick.

For example, a 50/50 blend of WC, 6 w/o TaNbC(60/40), 3 w/o TiC, 0.5 w/o TiN, 6 w/o Co and 0.175 w/o of carbon is processed. The processing is identical to the formulation described above. After sintering to full density at 1475° C. for 1 hour and vacuum maintained at approximately 100 microns-Hg, the tool blanks have a cobalt enriched gamma-free layer of approximately 30 microns. This gamma-free layer could be increased by increasing the time at sintering temperature. It is clear that carbon is one of the driving forces in the formation of a gamma-free layer. Therefore, it is important to have some excess carbon in a sintered tool blank if the gamma-free layer is going to be regenerated after the blanks are precision ground into the proper tool geometry.

To regenerate the gamma-free layer, the finished tool is heated in vacuum (approximately 100 microns Hg) at the temperatures above liquid phase. The thickness of the gamma-free layer is time and temperature dependent. One hour at 1475° C. at 100 microns Hg will yield from about one to about 15 micron of regenerated gamma-free layer.

The cemented carbide cutting tools are coated with at least one adherent coating layer comprising a refractory material. Typical refractory materials for coating cemented carbide cutting tools include alumina, the nitrides, carbides and carbonitrides of titanium, vanadium, chromium, zirconium, niobium, molybdenum, hafnium, and tantalum. Preferred coatings in accordance with this invention are alumina, titanium carbide, titanium carbonitride, titanium nitride and hafnium carbide, hafnium carbonitride and hafnium nitride. The coating layers are of a thickness ranging between about 0.1 microns to about 20 microns, preferably between about 1.0 and about 10 microns. The coating may comprise one or more layers of materials with distinctly different compositions and one intermediate adherent coating layer having a different chemical composition than the outer adherent coating layer.

Coating Methods

The cemented carbide cutting tools of this invention are coated with a refractory material by chemical vapor deposition techniques or physical vapor deposition techniques. For example, the preferred coatings of alumina, titanium carbide, titanium carbonitride, titanium nitride or hafnium carbide, hafnium carbonitride or hafnium nitride are applied by chemical vapor deposition. Other refractory materials are applied by chemical vapor deposition techniques where such techniques are applicable, or by physical vapor deposition techniques such as direct evaporation, sputtering, etc. Alternatively, the refractory material itself may be deposited by chemical or physical deposition techniques and subsequently nitrided or carburized to produce a refractory metal nitride or carbide coating.

Useful characteristics of the chemical vapor deposition method are the purity of the deposited layer and the tendency for some diffusional interaction between the layer being deposited and the substrate or intermediate adherent coating layer during early stages of the deposition process which leads to good layer adherency.

As an example, titanium nitride intermediate or outer adherent layers are formed on the cemented carbide substrates of cutting tools of this invention by passing a gaseous mixture of titanium tetrachloride, a gaseous nitrogen source such as nitrogen or ammonia, and hydrogen over the substrate at a temperature of between about 800° C. and 1300° C., preferably at temperatures above about 1000° C. The reaction is described by the following equation; hydrogen is added to insure that the reaction takes place in a reducing environment:

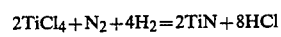

$$2TiCl_4 + N_2 + 4H_2 = 2TiN + 8HCl$$

The mixture is passed over the heated substrate or coated substrate until the desired coating thickness is achieved. Routine experimentation is used to determine the rate of coating thickness growth at a particular gaseous flow rate and temperature.

As another example, titanium carbide layers are formed on the cemented carbide substrate bodies or the intermediate coating layers of the cutting tools of this invention by passing a gaseous mixture of titanium tetrachloride, a gaseous carbon source such as methane, and hydrogen over the substrate or coated substrate at a temperature of between about 800° C. and 1300° C., preferably at temperatures above about 1000° C. The reaction is described by the following equation, although hydrogen is often used as a carrier gas:

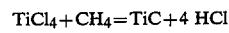

$$TiCl_4 + CH_4 = TiC + 4 HCl$$

The mixture is passed over the heated substrate or intermediate coating until the desired coating thickness is achieved. Routine experimentation is used to determine the rate of coating thickness growth at a particular gaseous flow rate and temperature.

As another example, titanium carbonitride intermediate layers or outer adherent layers are formed on the cemented carbide substrates or intermediate layers of the cutting tools of this invention in the chemical vapor deposition technique by passing a gaseous mixture of titanium tetrachloride, a gaseous carbon source such as methane, a gaseous nitrogen source such as nitrogen or ammonia, and hydrogen over the substrate at a temperature of between about 800° C. and 1300° C., preferably at temperatures above about 1200° C. Dissociated ammonia may be substituted for a mixture of nitrogen and hydrogen gases. The reaction is described by the following equation, although hydrogen is used as a carrier gas:

$$TiCl_4 + CH_4 + N_2 = Ti(C_xN_y) + 4HCl$$

The mixture is passed over the heated substrate or coated substrate until the desired coating thickness is achieved. Routine experimentation is used to determine the rate of coating thickness growth at a particular gaseous flow rate and temperature.

Control of the amounts of methane and nitrogen in the gas mixture permit the formation of layers in which the ratio of x to y in the formula $Ti(C_xN_y)$ are varied. The preferred values of x and y range between about 0.5 to about 0.6 for x and from about 0.4 to about 0.5 for y resulting in a preferred range of x/y ratio of from about 1.0 to about 1.5. The most preferred ratio of x to y is about 1.22, corresponding to values for x and y of about 0.55 and about 0.45, respectively.

The substrate bodies or coated substrate bodies produced by the methods detailed above can be coated with aluminum oxide by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is used as a carrier gas:

$$2AlCl_3 + 3 H_2O + Al_2O_3 + 6HCl$$

The substrate or coated substrate piece or pieces are heated to a temperature between about 800° C. to about 1500° C. and the gaseous mixture is passed over the heated substrate or coated substrate until the desired coating thickness is achieved. Routine experimentation is used to determine the rate of coating thickness growth at a particular gaseous flow rate and temperature.

In another, preferred method of coating the substrate or coated substrate bodies with adherent alumina coating layers, aluminum chloride is reacted with carbon dioxide in the presence of hydrogen gas according to the following equation:

$$2AlCl_3 + 3CO_2 + 3H_2 = Al_2O_3 + 3CO + 6 HCl;$$

carbon monoxide is optionally added to the gas mixture passed over the heated substrate or coated substrate bodies in order to establish the desired equilibrium gas composition.

Depending on the machining application and the work piece material, the combination of various coatings as described above can be tailored to enhance the overall tool performance. This is achieved through the combinations which lead to improved adherence of the coatings to substrate, and the coatings to coatings, and achieved by the improved structure/property of the substrate such as hardness, fracture toughness, impact resistance, chemical inertness, etc.

The new and improved coated cemented carbide cutting tool can be used for rough and heavy rough machining of steel.

The machining conditions considered to be roughing conditions for hardened (Rc=25–40) steel such as AlSl 4340 are:
Depth of cut (in.) 0.125–0.500 inches
Feed (ipr) 0.010–0.040 inches per revolution
Speed (sfm) 60–275 surface feet per minute
The heavy roughing conditions are:
Depth of cut (in.) 0.150–0.700
Feed (ipr) 0.050–0.080 inches per revolution
Speed (sfm) up to 130 surface feet per minute.

Table V illustrates the cemented carbide cutting tool characterization of tools made from various compositions where the WC powders were blended to optimize the properties through microstructural tailoring.

While there has been shown and described what is at present considered the preferred embodiment of the invention, it will be obvious to those skilled in the art that various changes and modifications may be made therein without departing from the scope of the invention as defined by the appended claims.

TABLE V

| CEMENTED CARBIDE SUBSTRATE CHARACTERIZATION COMPOSITION PREPARED FROM BLENDS OF "A" AND "B" TUNGSTEN CARBIDE POWDERS | | | | | |
|---|---|---|---|---|---|
| | 100% A | 75/25* | 50/50* | 25/75* | 100% B |
| Rockwell A Hardness | 90.7 ± .2 | 90.7 ± .2 | 90.9 ± .2 | 91.6 ± .2 | 92.1 ± .2 |
| Knoop Hardness (GN/m$^2$) | 13.7 ± .2 | 13.5 ± .4 | 14.0 ± .3 | 14.5 ± .4 | 15.0 ± .6 |
| Fracture Toughness (MN/m$^{3/2}$) | 9.0 ± .1 | 8.4 ± .3 | 8.1 ± .2 | 7.2 ± .2 | 6.8 ± .1 |

*ratio of A to B

What is claimed is:
1. A method of rough cut machining steel comprising turning a steel work piece on a lathe at an effective speed of up to about 275 surface feet per minute; moving a coated cemented carbide cutting tool across the surface of said steel workpiece at a feed rate from about 0.01 to about 0.04 inches per revolution, said coated cemented carbide cutting tool consisting essentially of a densified body having tungsten carbide grains, metal carbide grains selected from the group consisting of TiC, TaC, NbC, HfC, and combinations thereof, and a bond- ing phase consisting essentially of cobalt; said tungsten carbide grains being equal to or greater than 70 weight percent of said densified body, said tungsten carbide grains having an average grain size from about 0.9 to about 1.3 microns, and less than 10 percent of said tungsten carbide grains having a size less than 0.5 microns; said cobalt being from about 5 to about 10 weight percent of said densified body and the remainder being said metal carbide grains; said densified body being coated with an adherent refractory coating layer; and cutting said steel workpiece with said coated cemented carbide cutting tool to effect a depth of cut of about 0.125 to about 0.500 inches.

2. A method of rough cut machining steel comprising turning a steel work piece on a lathe at an effective speed of up to about 130 surface feet per minute;

moving a coated cemented carbide cutting tool across the surface of said steel workpiece at a feed rate from about 0.050 to about 0.080 inches per revolution;

said coated cemented carbide cutting tool consisting essentially of a densified body having tungsten carbide grains, metal carbide grains selected from the group consisting of TiC, TaC, NbC, HfC, and combinations thereof, and a bonding phase consisting essentially of cobalt;

said tungsten carbide grains being equal to or greater than 70 weight percent of said densified body, said cobalt being from about 5 to about 10 weight percent said densified body and the remainder being said metal carbide grains; said tungsten carbide grains having an average grain size from about 0.9 to about 1.3 microns and less than 10 percent of said tungsten carbide grains having a size less than 0.5 microns; said densified body being coated with an adherent refractory coating layer; and cutting said steel workpiece with said coated cemented carbide cutting tool to effect a depth of cut of about 0.150 to about 0.700 inches.

* * * * *